United States Patent
Li et al.

(10) Patent No.: US 9,048,834 B2
(45) Date of Patent: Jun. 2, 2015

(54) GROUPING OF PHYSICALLY UNCLONABLE FUNCTIONS

(71) Applicant: Intel Corporation, Santa Clara, CA (US)

(72) Inventors: Jiangtao Li, Beaverton, OR (US); Patrick Koeberl, Alsbach-Haenlein (DE); Sanu K. Mathew, Hillsboro, OR (US); Wei Wu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 40 days.

(21) Appl. No.: 13/997,268

(22) PCT Filed: Jan. 16, 2013

(86) PCT No.: PCT/US2013/021765
§ 371 (c)(1),
(2) Date: Jun. 23, 2013

(87) PCT Pub. No.: WO2014/112999
PCT Pub. Date: Jul. 24, 2014

(65) Prior Publication Data
US 2014/0218067 A1    Aug. 7, 2014

(51) Int. Cl.
*H03K 19/00*    (2006.01)
*H03K 19/003*    (2006.01)
*G06F 1/26*    (2006.01)
*H03K 19/177*    (2006.01)

(52) U.S. Cl.
CPC .............................. *H03K 19/17768* (2013.01)

(58) Field of Classification Search
CPC ... H03K 19/17768; G06F 21/67; G06F 21/75; G06F 21/10; G06F 9/52; G06F 9/526; G06F 21/79; G06F 12/1441
USPC .......... 326/8, 9; 710/200; 711/163; 726/1–36
See application file for complete search history.

(56) References Cited

U.S. PATENT DOCUMENTS

| | | | |
|---|---|---|---|
| 7,689,630 | B1 | 3/2010 | Lam |
| 7,898,283 | B1 * | 3/2011 | Koushanfar et al. ............... 326/8 |
| 8,274,306 | B1 | 9/2012 | Garcia |
| 8,386,990 | B1 | 2/2013 | Trimberger et al. |
| 8,418,006 | B1 | 4/2013 | Trimberger |
| 8,516,269 | B1 | 8/2013 | Hamlet et al. |
| 8,782,432 | B2 * | 7/2014 | Oshida et al. ................. 713/189 |
| 2008/0279373 | A1 | 11/2008 | Erhart et al. |
| 2009/0083833 | A1 | 3/2009 | Ziola et al. |
| 2010/0293384 | A1 | 11/2010 | Potkonjak |

(Continued)

OTHER PUBLICATIONS

G. Edward Suh et al., "Physical Unclonable Functions for Device Authentication and Secret Key Generation", in: Proceedings of the 44th annual Design Automation Conference Jun. 4-8, 2007. See pp. 2-3.

(Continued)

*Primary Examiner* — Dylan White
(74) *Attorney, Agent, or Firm* — Trop, Pruner & Hu, P.C.

(57) ABSTRACT

A physically unclonable function (PUF) includes a plurality of PUF elements to generate an N-bit PUF signature. For each bit in the N-bit PUF signature, a PUF group of K number of individual PUF elements indicating a single-bit PUF value is used to generate a group bit. The group bits are more repeatable than the individual PUF elements. The value K may be selected such that (K+1)/2 is an odd number.

20 Claims, 7 Drawing Sheets

(56) References Cited

U.S. PATENT DOCUMENTS

| | | |
|---|---|---|
| 2010/0293612 A1 | 11/2010 | Potkonjak |
| 2010/0322418 A1 | 12/2010 | Potkonjak |
| 2011/0002461 A1 | 1/2011 | Erhart et al. |
| 2011/0050279 A1* | 3/2011 | Koushanfar et al. ............ 326/8 |
| 2011/0055649 A1 | 3/2011 | Koushanfar et al. |
| 2011/0055851 A1 | 3/2011 | Potkonjak et al. |
| 2011/0215829 A1 | 9/2011 | Guajardo Merchan et al. |
| 2011/0239002 A1* | 9/2011 | Beckmann et al. ........... 713/189 |
| 2011/0317829 A1 | 12/2011 | Ficke et al. |
| 2012/0093308 A1 | 4/2012 | Choi |
| 2012/0106235 A1 | 5/2012 | Christensen et al. |
| 2012/0131340 A1 | 5/2012 | Teuwen et al. |
| 2012/0179952 A1 | 7/2012 | Tuyls et al. |
| 2012/0204023 A1 | 8/2012 | Kuipers et al. |
| 2013/0051552 A1 | 2/2013 | Handschuh et al. |
| 2013/0094648 A1 | 4/2013 | Goettfert et al. |
| 2013/0106461 A1 | 5/2013 | Ficke et al. |
| 2013/0142329 A1 | 6/2013 | Bell et al. |
| 2013/0147511 A1 | 6/2013 | Koeberl et al. |
| 2013/0156183 A1 | 6/2013 | Komano et al. |
| 2013/0246809 A1* | 9/2013 | Beckmann et al. ........... 713/189 |
| 2014/0091832 A1* | 4/2014 | Gotze et al. ....................... 326/8 |
| 2014/0189890 A1* | 7/2014 | Koeberl et al. ................. 726/34 |

OTHER PUBLICATIONS

International Search Report and Written Opinion, International Patent Application No. PCT/US2013/021765, Oct. 18, 2013, 9 pages.

\* cited by examiner

GROUPING OF PHYSICALLY UNCLONABLE FUNCTIONS

FIELD

The present disclosure relates to electronic security and in particular, to physically unclonable functions.

BACKGROUND

In various electronic devices and systems, physically unclonable functions (PUF) are used to generate unique signatures that are unfeasible to replicate and cannot be predicted. Certain values generated in a PUF may exhibit instability over time, which is a source of undesired error.

DESCRIPTION

Figure 1:
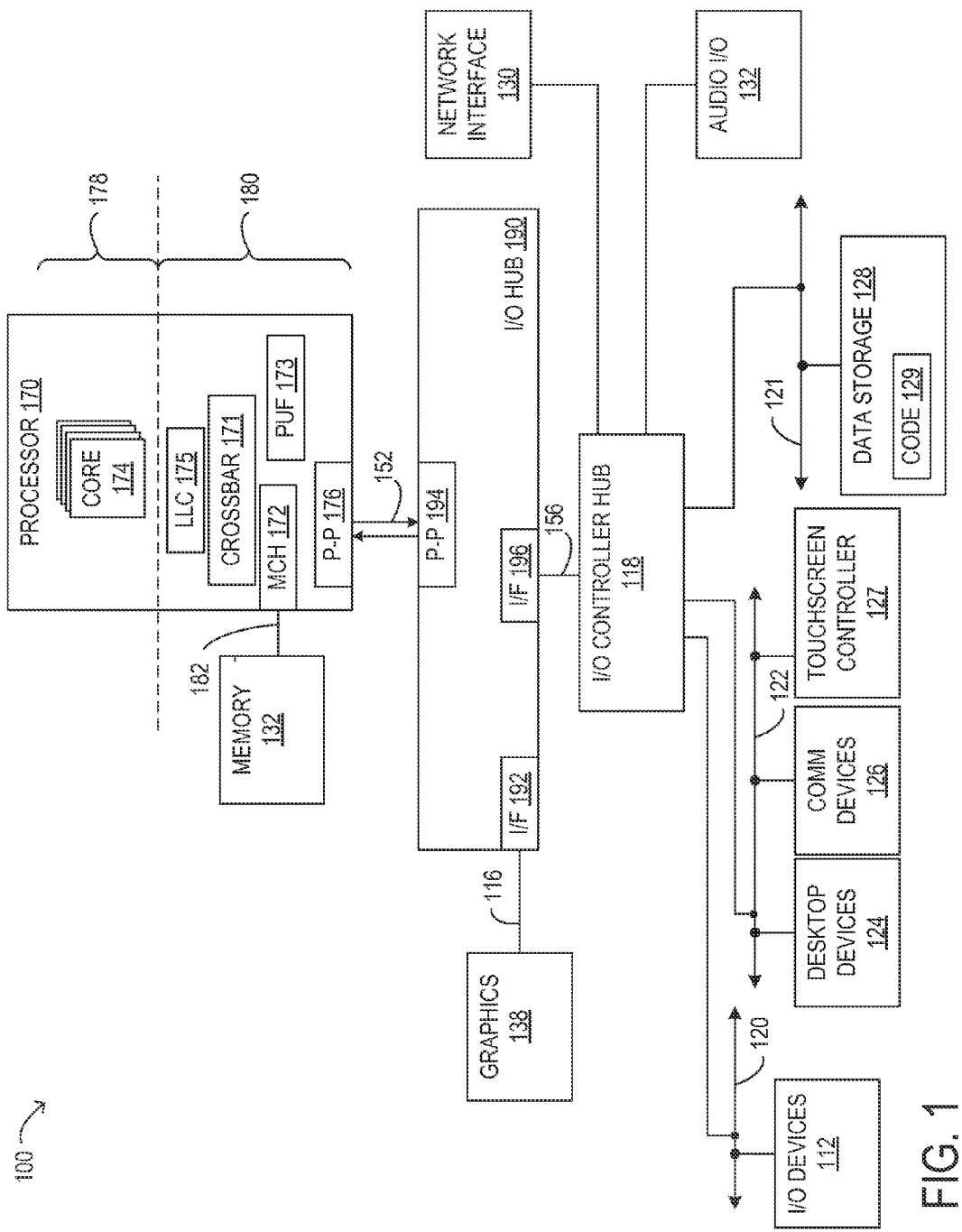
FIG. 1 illustrates a system used in conjunction with at least one embodiment.

Embodiments of the invention pertain to the use of PUFs to authenticate and identify individual integrated circuits (ICs, also referred to as "chips" and/or "semiconductor devices"). In at least one embodiment, an electronic device includes a plurality of PUF elements to indicate a corresponding plurality of single-bit PUF values, signature logic to generate an N-bit PUF signature, and an output to read the PUF signature. In some embodiments, the PUF signature includes a group bit from each of N groups of the plurality of PUF elements and a value of the group bit for a PUF group indicates a value associated with a majority of the PUF elements in the PUF group.

In some embodiments, the value of the group bit for a PUF group is determined based on values of a subset of the PUF elements in the PUF group. Embodiments of the subset of PUF elements include PUF elements that indicate a first majority value during an initial reading of the signature logic. The value of the group bit for a PUF group may, in some embodiments, be determined by a second majority value indicated by a majority of PUF elements in the subset. Some embodiments generate and store a mask indicating which PUF group elements comprise the subset of PUF elements and to store the first majority value. In some embodiments, each of the PUF groups includes K hits, where K is an integer greater than 0. In at least one embodiment, (K+1)/2 is an odd integer. In at least one embodiment, a PUF may be characterized in terms of its entropy and noise rate where the entropy is an indicator of how likely any give PUF will be a 1-majority or 0-majority device and the noise rate is an indicator of how likely it is that a 1-majority device exhibits a 0 state. In at least one embodiment, the PUFs described have an entropy exceeding 80% and a noise rate in the range of approximately 5-10%.

In at least one embodiment, a processor includes a plurality of PUF elements to indicate a corresponding plurality of single-bit PUF values and PUF signature logic to generate an N-bit PUF signature. In some embodiments, the PUF signature includes a group bit from each of N groups of the plurality of PUF elements. In some embodiments, a value of the group bit for a PUF group is determined based on values of PUF elements in the PUF group. In at least one embodiment, a value of the group hit for a PUF group is determined based on values of a subset of the PUF elements in the PUF group. In some embodiments, the subset of PUF elements includes PUF elements that indicated a first majority value for the PUF group during an initial or previous reading of the PUF signature logic. A value of the group bit for a PUF group may, in some cases, be determined by a second majority value comprising a value indicated by a majority of PUF elements in the subset.

In at least one embodiment, the processor includes a PUF register to store an indication of PUF data including an initial PUF signature generated by the PUF signature logic during an initial reading and a mask indicating which PUF elements in the PUF group belong to the subset of PUF elements. In some embodiments, each PUF group includes K PUF elements where (K+1)/2 is an odd integer and wherein a number of bits in the mask is limited to (K+1)/2.

In at least one embodiment, a computer system includes a processor and a memory accessible to the processor. The processor includes a plurality of PUF elements to indicate a corresponding plurality of single-bit PUF values and signature logic to generate an N-bit PUF signature. In some embodiments, the PUF signature includes a group bit from each of N groups of the plurality of PUF elements, wherein a value of the group bit for a PUF group is determined based on values of PUF elements in the PUF group, and wherein each of the PUF groups includes K bits, where K is an integer greater than 0. The computer system may be implemented in a platform such as a mobile platform that includes tablet devices, smartphones, and so forth. In at least one of these embodiments, the computer includes a touchscreen controller to manage client based input.

PUFs may be employed in a variety of applications, including, but not limited to, anti-counterfeiting, anti-tampering, inventory management, network access control, and cryptography. For such purposes, PUFs may be used in integrated circuits to generate an output that is unique to an individual instance of a manufactured part. In this manner, a PUF may be used to identify individual chips and/or to distinguish chips of the same type from one another.

In some embodiments, the value of a PUF for authentication lies in the unclonable nature of the PUF response. This unclonable feature results from a dependency of the PUF response on physical attributes of the underlying semiconductor device. For example, a PUF may exploit variability in process physics associated with the manufacture of a semiconductor device, which may result in randomized physical dimensions or material composition that give rise to an unpredictable PUF response. In another example, a PUF device may exploit existing physical features, such as surface roughness of a material layer in a semiconductor device, to obtain random variability in an electronic output signal.

Other desirable features for authentication include ease and/or speed of obtaining the PUF response, as well as low cost. PUFs may accordingly be implemented in a number of different types of semiconductor devices including a field-programmable gate array (FPGA), a programmable logic device (PLD), a digital signal processor (DSP), a microprocessor, static random access memory (SRAM), flip-flop transistors, radio frequency identification tags (RFIDs), optical devices, and/or application specific integrated circuits (ASICs), among others. Integrated circuits may use a PUF response as an internal security key and perform various authentication functions. In certain instances, the PUF response and related operations may be completely hidden from external entities. In this manner, a PUF element on a chip may enable authentication without the use of cryptography, which may be complex and expensive to implement and operate.

An inherent advantage of authentication elements is that PUFs are generally quite tamper resistant. Any effort to contact or otherwise access a PUF physically will change the physical nature of the PUF and affect the PUF behavior or value. Thus a PUF is resistant against physical intrusion.

Thus, while PUFs provide for a randomly unique marking of a chip, a desirable feature for a PUF is reproducibility and/or stability of the PUF response. In other words, the same PUF challenge should produce the same PUF response on a given PUF, irrespective of other factors. In practice, most PUF circuits will not achieve complete reproducibility, though the variability in the PUF response may be very small, such that the PUF remains useful for an intended authentication purpose. The variation in the PUF response may arise from thermal and/or electronic instability and may be overcome, at least to a degree, with external error correction techniques that may rely on so-called "helper data" to ensure a consistent PUF response. As will be described herein, a method and apparatus for reducing the variability of a PUF response is economical, secure, and may be used with different kinds of PUFs.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, for example, widget 12-1 refers to an instance of a widget class, which may be referred to collectively as widgets 12 and any one of which may be referred to generically as a widget 12.

Embodiments may be implemented in many different system types. Referring now to FIG. 1, a block diagram of selected elements of a processor system in accordance with an embodiment of the present disclosure is shown. FIG. 1 shows a system in which processors, memory, and input/output devices are interconnected by a number of point-to-point (P-P) interfaces, as will be described in further detail. However, in other embodiments (not shown in FIG. 1) the processor system may employ different bus architectures, such as a front side bus, a multi-drop bus, and/or another implementation. Although one processor is depicted in the example embodiment of FIG. 5 for descriptive clarity, in various embodiments, the point-to-point system architecture shown in FIG. 5 may be implemented with two processors. It is further noted that, in some embodiments, different numbers of processors may be employed using elements of the depicted architecture.

In the FIG. 1 embodiment, processor system 100 is a point-to-point interconnect system that includes processor 170. In the FIG. 1 embodiment, processor 170 is a multi-core processor including a plurality of cores 174, which may vary in number in individual implementations, as desired. As shown, a portion of processor 170 including cores 174 may be referred to as core portion 178, while a portion of processor 170 including other elements, yet excluding cores 174, may be referred to as uncore portion 180. In different embodiments (not shown in FIG. 1), a varying number of cores may be present in a particular processor. Cores 174 may comprise a number of sub-elements (not shown in FIG. 1), also referred to as clusters, that provide different aspects of overall functionality. For example, cores 174 may each include a memory cluster (not shown in FIG. 1) that may comprise one or more levels of cache memory. Other clusters (not shown in FIG. 1) in cores 174 may include a front-end cluster and an execution cluster.

In the FIG. 1 embodiment, processor 170 includes PUF 173 that generates a PUF signature with improved repeatability, as will be described in further detail herein.

In particular embodiments, cores 174 within processor 170 may not communicate directly with each other, but rather, may communicate via crossbar 171, which may include intelligent functionality such as cache control, data queuing, P-P protocols, and multi-core interfacing. Crossbar 171 may thus represent an intelligent uncore controller for uncore portion 180 that interconnects cores 174 with memory controller hub (MCH) 172, last-level cache memory (LLC) 175, and P-P interface 176, among other elements. In particular, to improve performance in such an architecture, cache controller functionality within crossbar 171 may enable selective caching of data within a cache hierarchy including LLC 175 and/or one or more caches present in cores 174. In certain embodiments (not shown), crossbar 171 includes a memory management unit that handles access to virtual memory addresses and maintains at least one translation lookaside buffer (not shown in FIG. 1) for improved performance with regard to memory access.

In the FIG. 1 embodiment, LLC 175 may be coupled to processor cores 174 as a shared resource such that a memory access instruction from any single core 174 may invoke LLC 175. Additionally, MCH 172 may provide for direct access by processor 170 to memory 132 via memory interface 182. For example, memory 132 may be a double-data rate (DDR) type dynamic random-access memory (DRAM) while memory interface 182 and MCH 172 comply with a DDR interface specification. Memory 132 may represent a bank of memory interfaces (or slots) that may be populated with corresponding memory circuits for a desired DRAM capacity.

Processor 170 may also communicate with other elements of processor system 100, such as I/O hub 190 and I/O controller hub 118, which are also collectively referred to as a ellipse that supports processor 170. P-P interface 176 may be used by processor 170 to communicate with I/O hub 190 via interconnect link 152. In certain embodiments, P-P interfaces 176, 194 and interconnect link 152 are implemented using Intel QuickPath Interconnect architecture.

In the embodiment of FIG. 1, I/O hub 190 includes interface 192 to couple I/O hub 190 with first bus 116, which may support high-performance graphics and/or video output to corresponding bus devices, such as graphics 138. Graphics 138 may represent a high-performance graphics engine that outputs to a display device (not shown in FIG. 1). In one embodiment, first bus 116 is a Peripheral Component Interconnect (PCI) bus, such as a PCI Express (PCIe) bus and/or another computer expansion bus or interface. I/O hub 190 may also be coupled to I/O controller hub 118 at interface 196 via interconnect link 156. In certain embodiments, interface 196 is referred to as a south bridge. I/O controller hub 118 may provide I/O interconnections for various computer system peripheral devices and interfaces and may provide backward compatibility with legacy computer system peripheral devices and interfaces. Thus, I/O controller hub 118 is shown providing network interface 130 and audio I/O 132, as well as, providing interfaces to second bus 120, third bus 122, and fourth bus 121, as will be described in further detail.

Second bus 120 may support expanded functionality for microprocessor system 100 with I/O devices 112, and may be a PCI-type computer bus. Third bus 122 may be a peripheral bus for end-user consumer devices, represented by desktop devices 124, communication devices 126, and touchscreen controller 127, which may further include various types of keyboards, computer mice, communication devices, data storage devices, bus expansion devices, device controllers, etc. For example, touchscreen controller 127 may represent a controller for a touchscreen included with processor system 100. In certain embodiments, third bus 122 represents a Universal Serial Bus (USB) or similar peripheral interconnect bus. Fourth bus 121 may represent a computer interface bus for connecting mass storage devices, such as hard disk drives, optical drives, and disk arrays, which are generically represented by data storage 128, shown including code 129 that may be executable by processor 170.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

Figure 2:
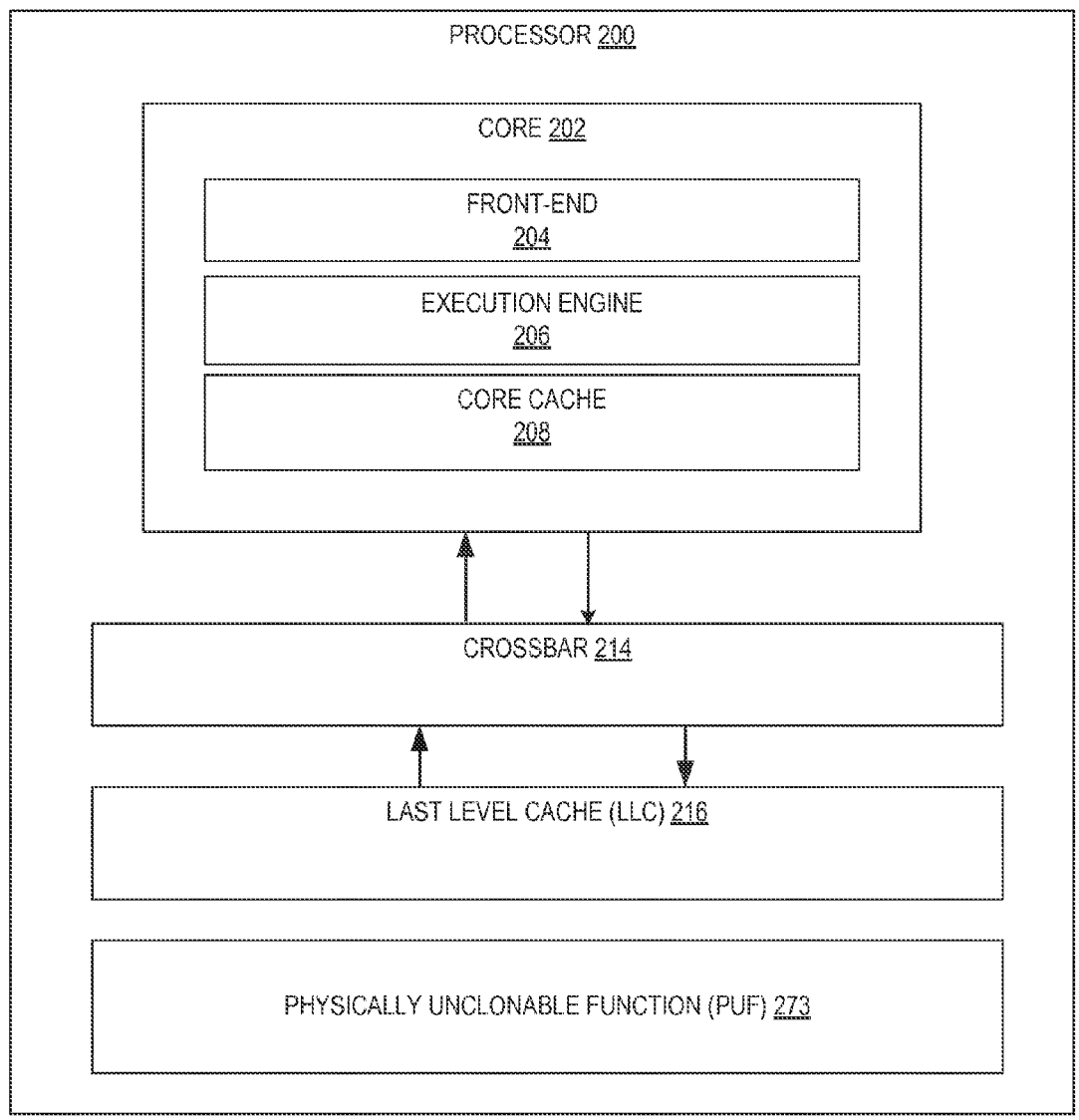
FIG. 2 illustrates a processor used in conjunction with at least one embodiment.

Referring now to FIG. 2, a block diagram of selected elements of one embodiment of a processor 200 is shown. Processor 200 may be a multi-core processor including a plurality of processor cores. In FIG. 2, processor 200 is shown including core 202, which may be representative for a plurality of cores, when present. It is noted that other elements of processor 200 besides core 202 may be referred to as an uncore. Although a singular core is depicted in the example embodiment of FIG. 2 for descriptive clarity, in various embodiments, a different number of cores may be employed using elements of the depicted architecture. Core 202 may comprise a number of sub-elements, also referred to as clusters, that provide different components of overall functionality. For example, core 202 may include front-end 204, execution engine 206, and core cache 208.

In FIG. 2, front-end 204 may be responsible for fetching instruction bytes and decoding those instruction bytes into micro-operations that execution engine 206 and/or core cache 208 consume. Thus, front-end 204 may be responsible for ensuring that a steady stream of micro-operations is fed to execution engine 206 and/or core cache 208. Execution engine 206 may be responsible for scheduling and executing micro-operations and may include buffers for reordering micro-operations and a number of execution ports (not shown in FIG. 2). Core memory 208 may include multiple levels of a cache hierarchy. In various embodiments, core cache 208 may include a first level cache (not shown) that may correspond to an L0 cache. Core cache 208 may further include mid-level cache (not shown) that may correspond to an L1 cache in some embodiments.

In particular embodiments, core 202 within processor 200 is not equipped with direct means of communicating with another core (not shown), but rather, communicates via crossbar 214, which may include intelligent functionally such as cache control, data queuing, P-P protocols, and multi-core interfacing. Crossbar 214 may thus represent an intelligent uncore controller that interconnects core 202 with LLC 216, among other elements (not shown) of processor 200.

In the FIG. 2 embodiment, processor 200 includes LLC 216, which may be a higher-level cache that operates in conjunction with core cache 208, which may further include a first level cache and a mid-level cache (not shown). Thus, LLC 216, along with core cache 208, may represent a part of a cache hierarchy. During operation, memory requests from execution engine 206 may first access core cache 208 before looking up any other caches within a system. Accordingly, for improved performance, frequently accessed data may be present in the lowest possible cache level, i.e., core cache 208. When the requested data is not present in core cache 208, a request may be issued to LLC 216, which may be a shared cache among a plurality of cores (not shown in FIG. 2). In the FIG. 2 embodiment, processor 200 is shown including PUF 273, which generates a PUF signature with improved repeatability, as will be described in further detail herein.

Figure 3:
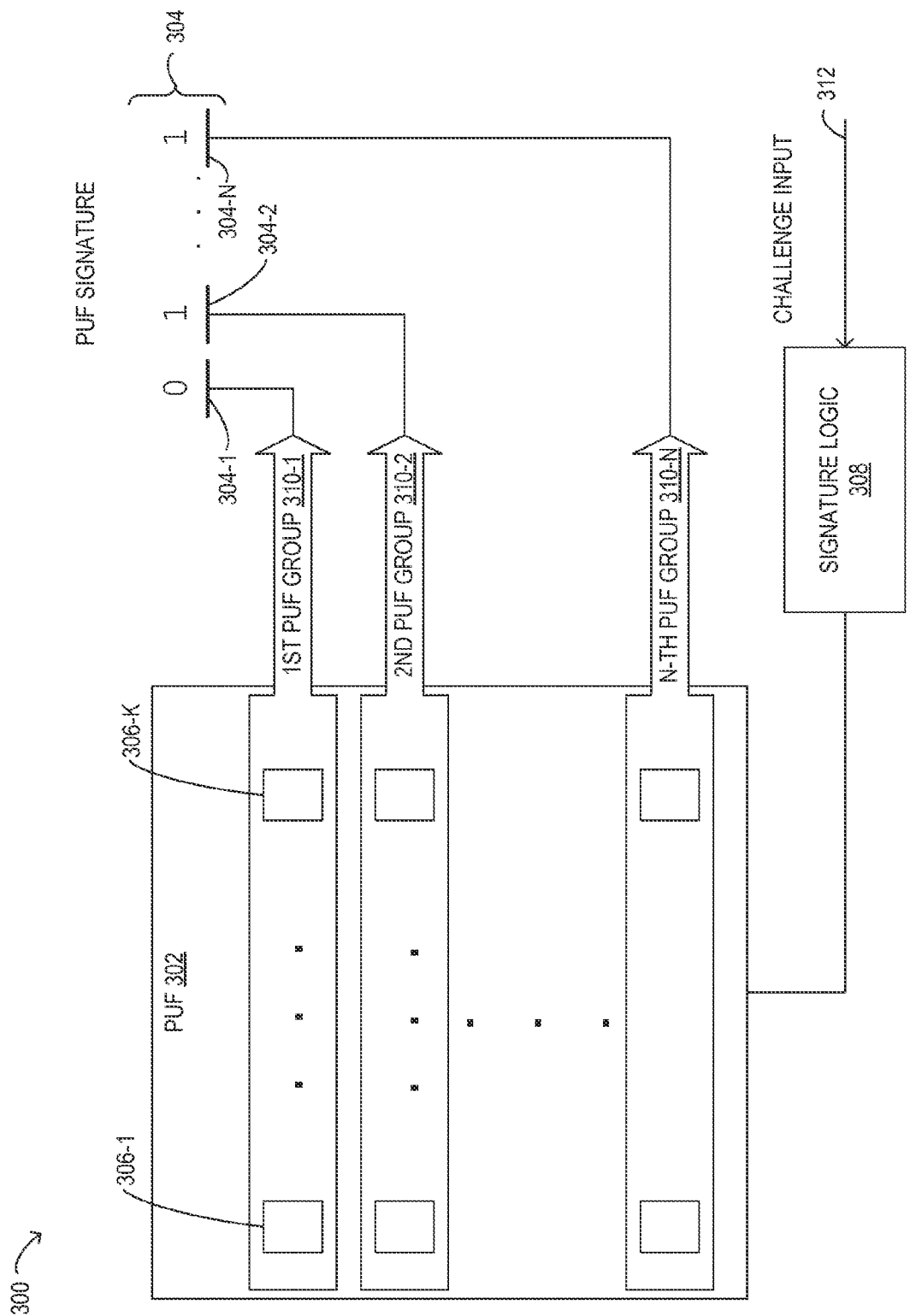
FIG. 3 illustrates a physically unclonable function generator used in conjunction with at least one embodiment.

Advancing now to FIG. 3, selected elements of an embodiment of PUF generator 300 are illustrated. As shown, PUF generator 300 depicts elements that may be used to generate PUF signature 304 in an electronic device, such as a processor, while preventing errors generally associated with PUFs due to instability, according to the methods described herein.

In the FIG. 3 embodiment, PUF generator 300 includes PUF 302, which includes individual PUF elements 306 that produce single-bit PUF values. It is noted that PUF elements 306 may be any of a variety of different types of PUFs, as mentioned previously. Instead of a direct one-to-one correspondence of PUF elements 306 to individual bits in PUF signature 304 (see FIG. 7, prior art), PUF generator 300 is implemented with K-number of PUF elements 306 that comprise PUF group 310, from which a corresponding group bit is used as a constituent bit in PUF signature 304. In this manner, a single bit in PUF signature 304 may be determined based on K-number of values of PUF elements 306 in corresponding PUF group 310, which may improve an overall repeatability of PUF signature 304, as compared with a repeatability of individual PUF elements 306.

In FIG. 3, PUF 302 is shown with N-number of PUF groups 310, each PUF group 310 having K-number of PUF elements 306. For example, $1^{st}$ PUF group 310-1 is shown having PUF elements 306-1 to 306-K. Similarly, $2^{nd}$ PUF group 310-2 and N-th PUF group 310-N also have K-number of PUF elements 306 each (not marked in FIG. 3), respectively.

In operation of PUF generator 300, signature logic 308 may respond to receiving challenge input 312 by generating one bit of PUF signature 304 for each PUF group 310. Thus, $1^{st}$ PUF group 310-1 may result in PUF signature bit 304-1, $2^{nd}$ PUF group 310-1 may result in PUF signature bit 304-2, and so on, up to N-th PUF group 310-N, which may result in PUF signature bit 304-N. The improvement in repeatability of PUF signature 304 may be achieved because a collective repeatability of PUF group 310 for a single bit value (e.g., a majority value) may be greater than a repeatability for individual PUF element 306. The improvement in repeatability may be sustained over various operating conditions, such as voltage and temperature, that PUF generator 300 is subject to. It is noted that PUF generator 300 is implemented with K+N number of PUF elements 306. Challenge input 312 may represent any of a variety of input signals, triggers, codes, instructions, and/or bit patterns that signature logic 308 is implemented to recognize. In certain embodiments, challenge input 312 may be a restricted input and/or may itself be subject to various security or authentication methods (not described herein). It is further noted that PUF signature 304, shown as an output value in FIG. 3, may not be stored by PUF generator 300, but may be generated and transmitted on request, such as on receipt of challenge input 312. In this manner, PUF 302 may represent a unique source for PUF signature 304 in an electronic device implementing PUF generator 300.

Figure 4:
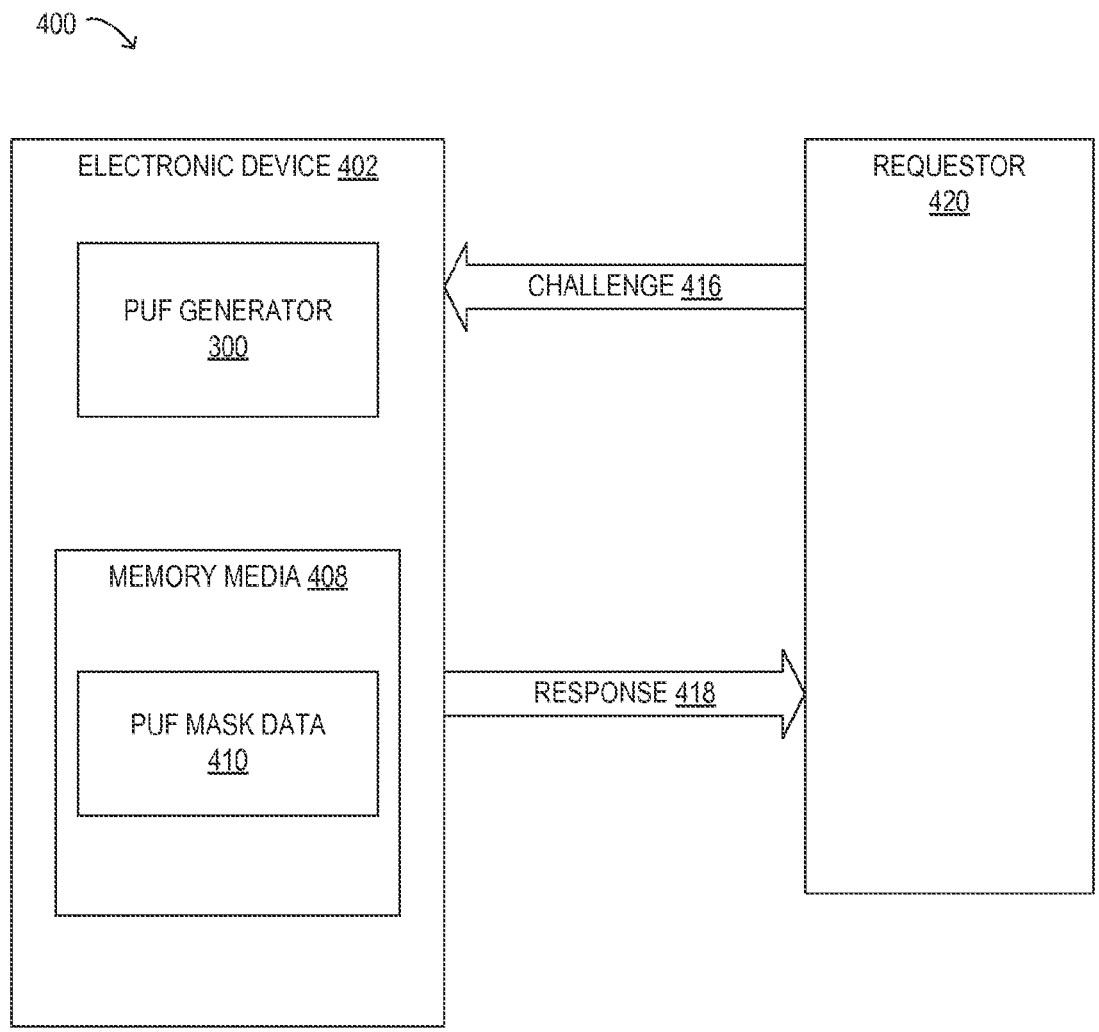
FIG. 4 illustrates an electronic system used in conjunction with at least one embodiment.

Turning now to FIG. 4, selected elements of an embodiment of electronic system 400 are illustrated. In the FIG. 4 embodiment, electronic system 400 depicts a general implementation of PUF generator 300, described above with respect to FIG. 3. In the FIG. 4 embodiment, requestor 420 may be an entity that seeks to obtain a PUF signature from electronic device 402, which includes PUF generator 300, and therefore, is also unclonable. Although shown as a separate entity, in certain embodiments (not shown) requestor 420 may be a component included in electronic device 402. For example, when electronic device 402 is a processor, requestor 420 may represent another component included in the processor. Accordingly, electronic system 400 may describe implementations where a PUF signature is provided externally and/or internally to electronic device 402. In operation, requestor 420 may issue challenge 416 to electronic device 402 and receive, in response, response 418, which may include a PUF signature (not shown in FIG. 4, see FIG. 3). PUF generator 300 may receive challenge 416 (or another challenge input 312 derived from challenge 416, see FIG. 3) as an indication and/or request to generate the PUF signature. PUF generator 300 may then generate the PUF signature, such as PUF signature 304 in FIG. 3. In generating the PUF signature, PUF generator 300 may access memory media 408 for storing and retrieving PUF mask data 410, which may include helper data, as will be described in further detail herein. In certain embodiments, memory media 408 and/or PUF mask data 410 may be integrated within PUF generator 300 (not shown). Once PUF generator 300 has generated the PUF signature, the PUF signature may be included in response 418. It is noted that various other implementations of PUF generator 300 within electronic system 400 may be realized within the scope of the present disclosure.

Figure 5:
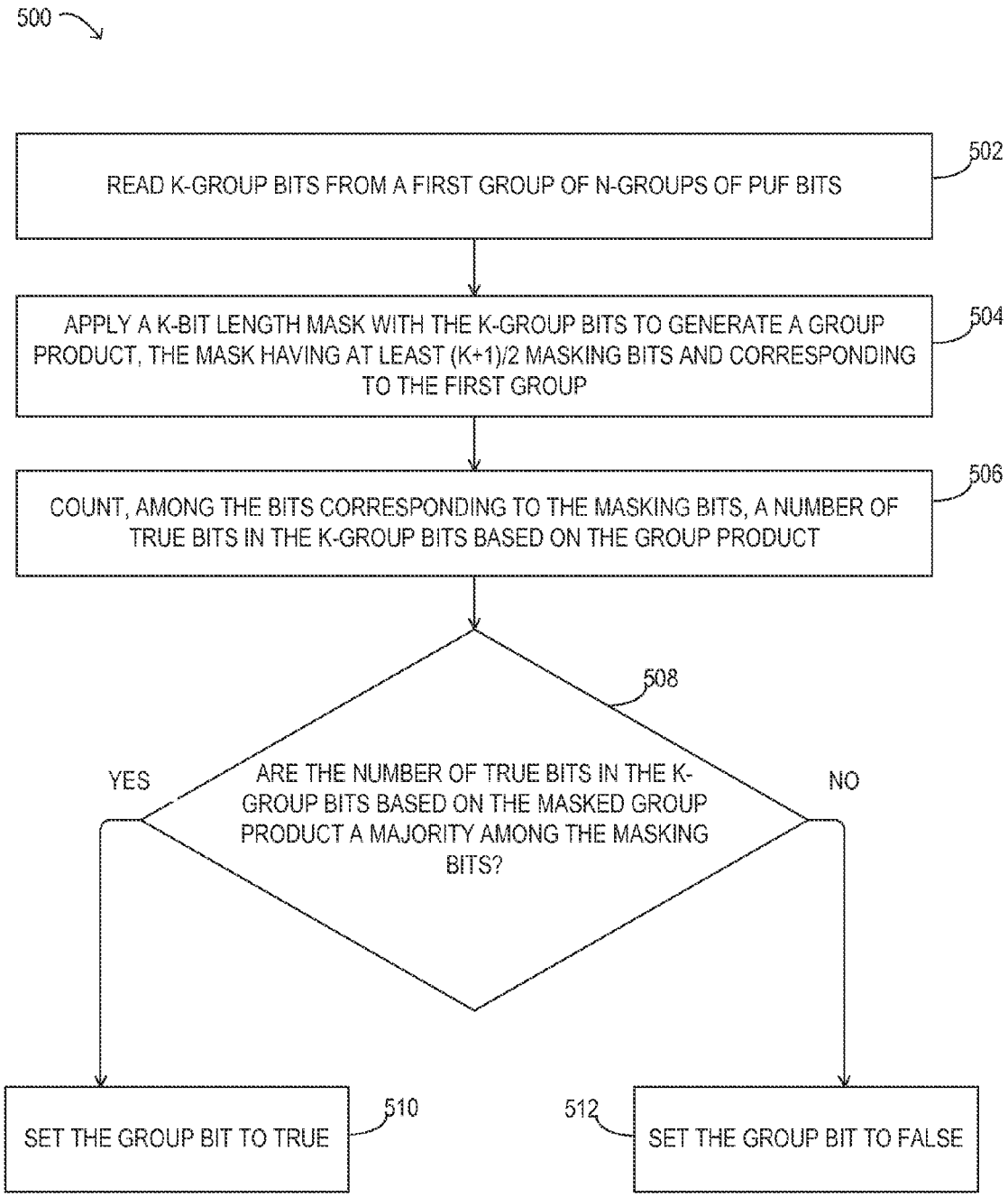
FIG. 5 illustrates one embodiment of a method for evaluating a physically unclonable function.

Turning now to FIG. 5, a flow chart describing selected elements of an embodiment of method 500 for generating an N-bit length PUF signature based on groups of PUF elements is illustrated. It is noted that operations in method 500 may be omitted or rearranged in different embodiments, as desired. Method 500 may be executed, at least in part, by PUF generator 300 including signature logic 308 (see FIG. 3).

Method 500 may begin by reading (operation 502) K-group bits from a first group of N-groups of PUF bits. It is noted that K may be an integer greater than zero. In particular embodiments, K may further be restricted to values where (K+1)/2 is an odd number. Values of K and/or N may be defined when PUF generator 300 is designed and/or manufactured. A K-bit length mask may be applied (operation 504) with the K-group bits to generate a group product, while the mask may have at least (K+1)/2 masking bits and may correspond to the first group. Application of the mask may include multiplication of the mask value with the K-group bits when the group bit is 1. When the group bit is 0, application of the mask may first include inversion of the K-group bits followed by multiplication with the mask. The mask referenced in operation 504 may be generated prior to execution of method 500, for example, by performing method 600 (see FIG. 6). For the purposes of describing method 500, it will be assumed that the masking bits in the mask are true bits, although in another embodiment (not shown) the mask may be used with reversed polarity. Among the bits corresponding to the masking bits, a number of true bits are counted (operation 506) from the group product. Again, for the purposes of descriptive clarity, method operations 506 and 508 arbitrarily reference true bits, but in different embodiments (not shown), false bits may be alternatively referenced in method 500. Next, a decision may be made (operation 508) whether the number of true bits counted from the masked group product are a majority among the masking bits. When the result of operation 508 is YES, then the group bit is set (operation 510) to true. When the result of operation 508 is NO, then the group bit is set (operation 512) to false.

To further illustrate method 500, a specific example of generating a single PUF group where K=5 will now be described. First, the value of the K-group bits read in operation 502 will be given by $\{0, 0, 1, 0, 0\}$. During an initialization or set-up phase that is performed prior to method 500 (see method 600, FIG. 6), it will be determined that the majority bit for this PUF group is 0 and the mask for this PUF group is $\{1, 1, 0, 1, 1\}$, where 1 s in the mask are masking bits that mark the location of the group bit (0) in the PUF group. Since the mask will be stored by PUF generator 300 and is retrievable, a complete stored mask with up to K number of masking bits may represent a security threat, since access to such mask data could enable reconstruction of the PUF signature. Therefore, to provide for extra security, the number of masking bits in the mask may be limited to (K+1)/2 bits, or in this example, 3 bits. Therefore, the stored mask may actually have the value $\{1, 1, 0, 1, 0\}$ (or another permutation of the complete mask with only 3 masked bits). Then, after inverting the K-group bits to $\{1, 1, 0, 1, 1\}$ because the initial group bit was 0, the mask $\{1, 1, 0, 1, 0\}$ may be applied in operation 504 to result in a masked group product $\{1, 1, 0, 1, 0\}$, where 1 s now represent false (0) bits in the original K-group bits due to the inverting. Counting, in operation 506, the $1^{st}$, $2^{nd}$, and $4^{th}$ bits in the K-group bits, we see that these three values are all 0, so the number of true bits is not a majority in operation 508. Accordingly, the group bit is set to false (0) in operation 512. It is noted that when any one zero bit in the K-group bits read in this example in operation 502 becomes inverted over time, the method will yield the same result.

Figure 6:
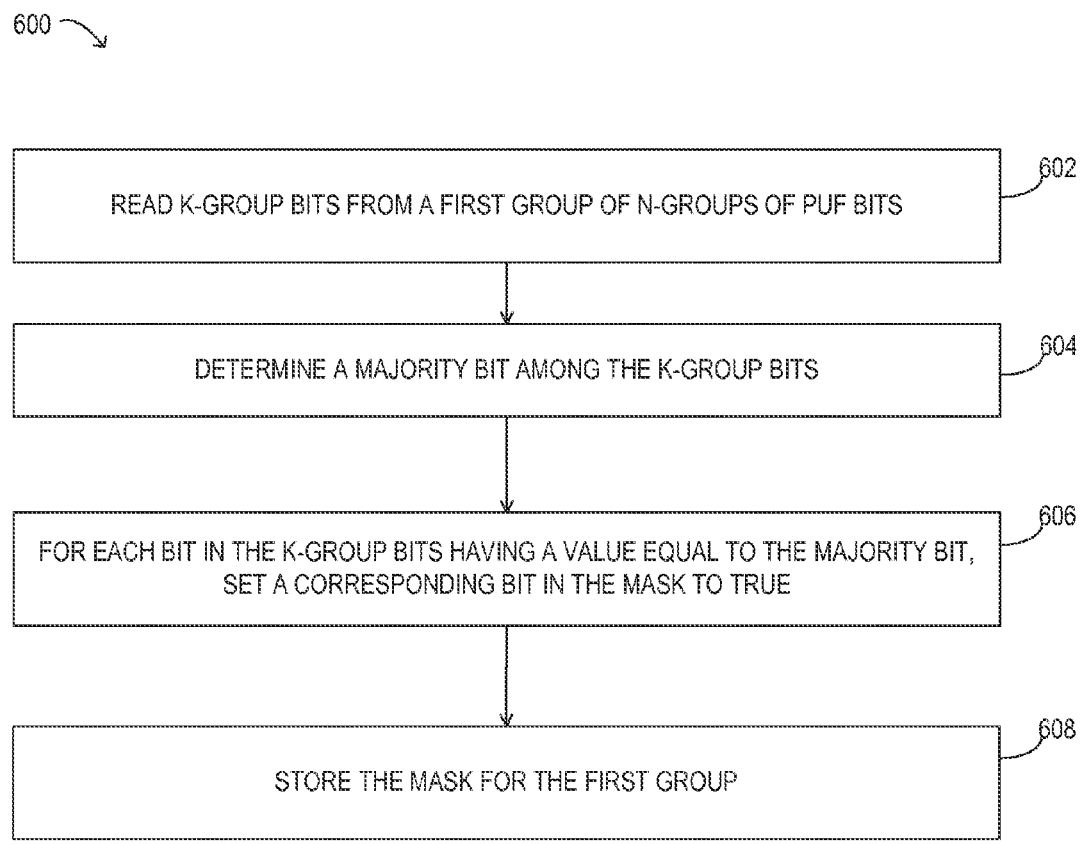
FIG. 6 illustrates one embodiment of a method for initializing a physically unclonable function.

Turning now to FIG. 6, a flow chart describing selected elements of an embodiment of method 600 for generating and storing a K-bit length mask as helper data is illustrated. It is noted that operations in method 600 may be omitted or rearranged in different embodiments, as desired. Method 600 may be executed, at least in part, by PUF generator 300 including signature logic 308 (see FIG. 3). It is noted that method 600 may be executed at least once prior to execution of method 500 (see FIG. 5).

Method 600 may begin by reading (operation 602) K-group bits from a first group of N-groups of PUF bits. A majority bit among the K-group bits may be determined (operation 604). For each bit in the K-group bits having a value equal to the majority bit, a corresponding bit in the mask may be set (operation 606) to true. The mask for the first group may be stored (operation 608). The mask stored in operation 608 may be retrieved and used for operation 504 in method 500.

Figure 7:
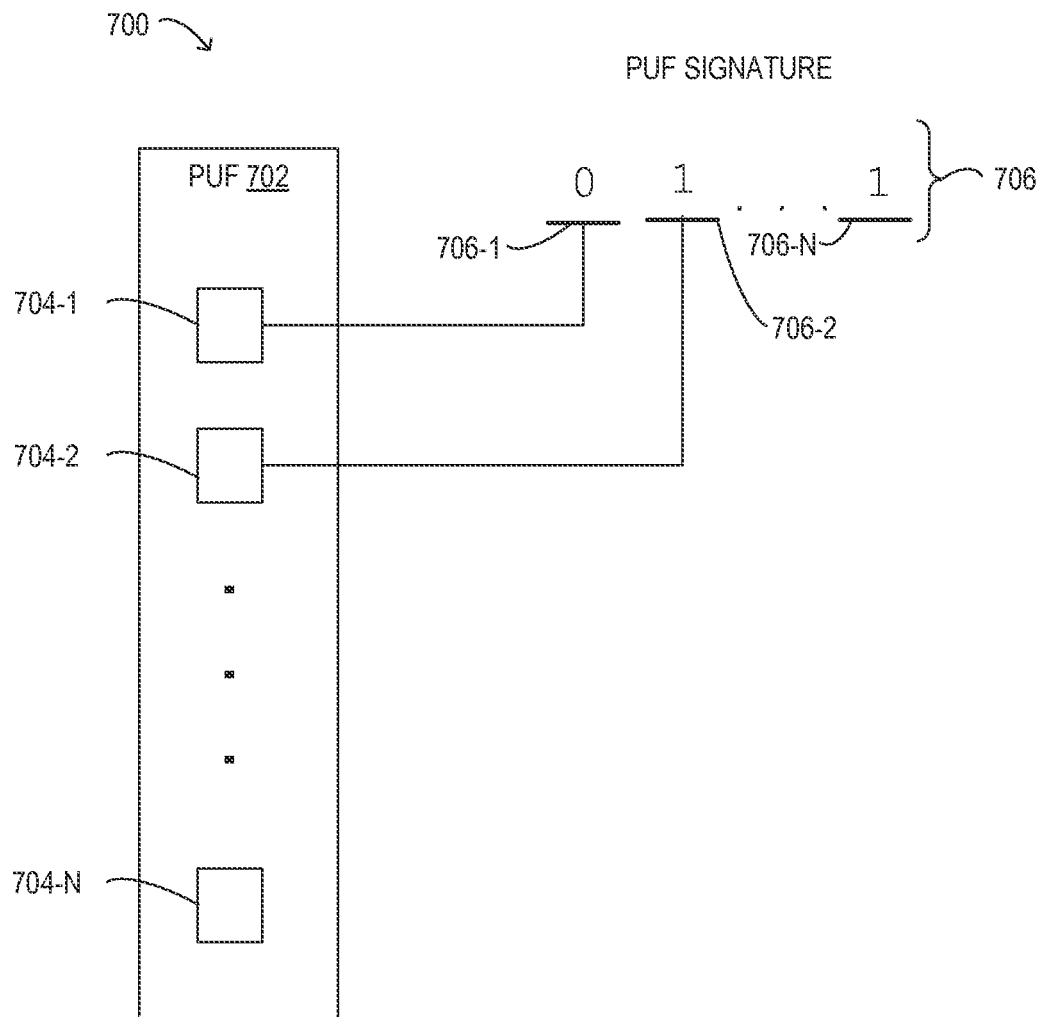
FIG. 7 illustrates a prior art physically unclonable function.

Advancing now to FIG. 7, selected elements of an embodiment of prior art PUF generator 700 are illustrated. As shown, PUF generator 700 depicts elements that may be used to generate prior art PUF signature 706 in an electronic device. In the FIG. 7 embodiment, PUF generator 700 includes prior art PUF 702, comprised of N-number of PUF elements 704, each indicating a binary value. As shown in prior art FIG. 7, PUF element 704-1 is directly used for PUF signature bit 704-1, PUF element 704-2 is directly used for PUF signature bit 706-2, and so on, up to PUF element 704-N, which is directly used for PUF signature bit 706-N. Thus, in prior art PUF generator 700, any variability in PUF elements 704 will directly result in variability of PUF signature 706, which is a source of undesired error in PUF signature 706.

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A processor comprising:
    a plurality of physically unclonable function (PUF) elements to indicate a corresponding plurality of single-bit PUF values;
    signature logic to generate an N-bit PUF signature, wherein the N-bit PUF signature includes a group bit from each of N groups of the plurality of PUF elements, and wherein a value of the group bit for a PUF group is to indicate a value associated with a majority of the PUF elements in the PUF group, each of the N groups of the plurality of PUF elements including more than one PUF element; and
    an output to read the N-bit PUF signature.

2. The processor of claim 1, wherein the value of the group bit for a PUF group is to be determined based on values of a subset of the PUF elements in the PUF group.

3. The processor of claim 2, wherein the subset of PUF elements includes PUF elements that indicated a first majority value during an initial reading of the signature logic.

4. The processor of claim 3, wherein the value of the group bit for a PUF group is to be determined by a second majority value comprising a value indicated by a majority of PUF elements in the subset.

5. The processor of claim 4, further comprising an output to:
    store a mask to indicate which PUF group elements comprise the subset of PUF elements; and
    store the first majority value.

6. The processor of claim 1, wherein each of the PUF groups includes K bits, where K is an integer greater than 0.

7. The processor of claim 6, wherein (K+1)/2 is an odd integer.

8. The processor of claim 1, wherein the N-bit PUF signature is repeatable at a higher reliability than at least some of the plurality of PUF elements.

9. A processor, comprising:
    a plurality of physically unclonable function (PUF) elements to indicate a corresponding plurality of single-bit PUF values;
    PUF signature logic to generate an N-bit PUF signature, wherein the N-bit PUF signature includes a group bit from each of N groups of the plurality of PUF elements, wherein a value of the group bit for a PUF group is to be determined based on values of a subset of PUF elements in the PUF group; and
    an output to receive the N-bit PUF signature generated by the PUF signature logic.

10. The processor of claim 9, wherein the subset of PUF elements includes PUF elements that indicated a first majority value for the PUF group during a previous reading of the PUF signature logic.

11. The processor of claim 10, wherein the value of the group bit for a PUF group is to be determined by a second majority value comprising a value indicated by a majority of PUF elements in the subset.

12. The processor of claim 11, further comprising a PUF register to store an indication of PUF data including an initial PUF signature generated by the PUF signature logic during an initial reading and a mask to indicate which PUF elements in the PUF group belong to the subset of PUF elements.

13. The processor of claim 12, wherein each PUF group includes K PUF elements where (K+1)/2 is an odd integer and wherein a number of bits in the mask is limited to (K+1)/2.

14. The processor of claim 13, wherein (K+1)/2 is an odd integer.

15. A system comprising:
    a processor;
    a touchscreen controller; and
    a memory accessible to the processor;
    wherein the processor comprises:
        a plurality of physically unclonable function (PUF) elements to indicate a corresponding plurality of single-bit PUF values;
        and
        signature logic to generate an N-bit PUF signature, wherein the N-bit PUF signature includes a group bit from each of N groups of the plurality of PUF elements, wherein a value of the group bit for a PUF group is to be determined based on values of a subset of PUF elements in the PUF group, and wherein each of the PUF groups includes K PUF elements, where K is an integer greater than 0.

16. The system of claim 15, wherein the subset of PUF elements includes PUF elements that indicated a first majority value for the PUF group during a previous reading of the signature logic.

17. The system of claim 16, wherein the value of the group bit for a PUF group is to be determined by a second majority value comprising a value indicated by a majority of PUF elements in the subset.

18. The system of claim 17, further comprising an output to:
    store a mask to indicate which PUF elements in the PUF group comprise the subset of PUF elements; and
    store the first majority value.

19. The system of claim 18, wherein the mask is limited to (K+1)/2 bits for indicating PUF elements.

20. The system of claim 19, wherein (K+1)/2 is an odd integer.

* * * * *